United States Patent [19]
Adams et al.

[11] Patent Number: 5,108,324
[45] Date of Patent: Apr. 28, 1992

[54] DRIVE SYSTEM FOR A BOAT PROPELLER

[75] Inventors: Werner Adams, Crailsheim; Jurgen Liebe, Schwabisch-Hall; Wolfgang Weber, Crailsheim; Helmut Rauer, Crailsheim; Klaus Nolz, Crailsheim; Georg Wahl, Crailsheim, all of Fed. Rep. of Germany

[73] Assignee: Voith Turbo GmbH & Co. KG, Crialsheim, Fed. Rep. of Germany

[21] Appl. No.: 613,140

[22] Filed: Nov. 15, 1990

[30] Foreign Application Priority Data

Nov. 16, 1989 [DE] Fed. Rep. of Germany ....... 3938085

[51] Int. Cl.$^5$ ........................................... B63H 23/26
[52] U.S. Cl. ...................................... 440/75; 440/86
[58] Field of Search ................... 440/549, 74, 75, 84, 440/86, 88; 114/269; 180/337, 364, 367; 192/3.21, 3.22, 3.34; 60/330, 331, 334, 335; 74/DIG. 8, 720, 730.1, 732.1, 655, 810.1, DIG. 2

[56] References Cited

U.S. PATENT DOCUMENTS

| | | | |
|---|---|---|---|
| 2,140,324 | 12/1938 | Lysholm | 60/54 |
| 2,298,310 | 6/1942 | Ray | 74/720 |
| 2,749,776 | 6/1956 | Fischer et al. | 74/740 |
| 2,996,932 | 8/1961 | Gsching | 74/677 |
| 3,352,395 | 11/1967 | Hilpert | 192/103 |
| 3,360,935 | 1/1968 | Schneider | 60/54 |
| 3,388,684 | 6/1968 | Gros et al. | 115/34 |
| 4,009,571 | 3/1977 | Black et al. | 60/354 |
| 4,012,908 | 3/1977 | Dundore | 60/354 |
| 4,242,925 | 1/1981 | Farkas | 74/792 |
| 4,245,520 | 1/1981 | Semar | 74/377 |
| 4,305,710 | 12/1981 | Schneider | 440/75 |
| 4,459,873 | 7/1984 | Black | 440/75 |
| 4,820,209 | 4/1989 | Newman | 440/75 |
| 4,887,984 | 12/1989 | Newman | 440/86 |

FOREIGN PATENT DOCUMENTS 547330 1/1941 United Kingdom .

*Primary Examiner*—Joseph F. Peters, Jr.
*Assistant Examiner*—Clifford T. Bartz
*Attorney, Agent, or Firm*—Baker & Daniels

[57] ABSTRACT

The present invention is a drive system for a boat propeller, with a motor and a reverse gearbox. For forward travel a hydrodynamic coupling is provided and for reverse travel a hydrodynamic reverse converter is provided. The coupling is operated with its maximum filling degree in the upper range of the propeller speed, but in the lower range of propeller speed with a partial filling. Thus, the hydrodynamic coupling is the single hydrodynamic power transfer unit for the entire forward speed range. In order for the boat to be able to be quickly braked down from full speed, the reverse converter is arranged to provide a high torque conversion in the reactive braking range.

6 Claims, 2 Drawing Sheets

DRIVE SYSTEM FOR A BOAT PROPELLER

BACKGROUND OF THE INVENTION

1. Field of the Invention

The invention concerns a drive system for a boat propeller including a motor that delivers a specific nominal motor torque, and including a reverse gearbox arranged between motor and propeller.

2. Prior Art

Such a drive system is known from U.S. Pat. No. 2,298,310. This prior drive system advantageously utilizes a purely hydrodynamic reverse gearbox wherein the travel direction can be reversed solely by switching the contact between two hydrodynamic working circuits. For instance, with the hydrodynamic coupling filled while travelling forward, all that needs to be done to reverse the travel direction is to fill the reverse converter and at the same time to empty the coupling. Thus, the reversing maneuver can be completed within a relatively short time without causing wear because mechanical shift elements are not needed for the reversing maneuver.

According to the aforementioned U.S. Pat. No. 2,298,310, another hydrodynamic torque converter is provided for forward travel, in addition to the hydrodynamic coupling. Drive systems for boat propellers are known as well from the U.S. Pat. No. 4,305,710 where the transfer of power from a forward direction occurs either through a multiple disk coupling or through a hydrodynamic torque converter to a reverse direction through a hydrodynamic torque converter. Mechanical couplings, such as multiple disk couplings, have the disadvantage of being associated with wear. During forward movement, it is undesirable for power transfer to occur through a hydrodynamic torque converter because of the relatively low efficiency of the converter.

SUMMARY OF THE INVENTION

The present invention solves many problems of the prior art by designing a drive system to be suited for relatively small watercraft which have a very large range of travel speeds. The drive system is suited especially for "hydrogliders" which, at swift forward velocities, rise above the water surface (due to hydrodynamic buoyancy forces) so that the propeller also extensively emerges above the water surface. Occasionally such boats are also immersed in the water in the customary manner when traveling at a relatively slow speed.

Watercraft employing the present invention should include a motor (preferably a charged diesel motor) which operates in the entire range of travel speeds in its upper range, i.e., in the range of good torque delivery. Additionally the drive system should operate at maximum efficiency in the major operating range of the vehicle, i.e., in the above-mentioned upper range of speeds. Also, the watercraft should be capable of going from full forward travel to a standstill by a "crash stop maneuver", within an extremely short time. Further, an extremely quick changeover from forward to reverse travel may be necessary. Both are possible without overly suppressing the speed of the motor.

Using a hydrodynamic coupling with a variable degree of filling makes sure that both revving the drive system up from a standstill and slow travel (when the boat is immersed in the water) can take place without problems, in addition to the ability to accelerate the boat up to the changeover to the high speed hydroplaning. This hydroplaning in the upper speed range is the major operating range of the boat. The hydrodynamic coupling operates in this major operating range with its maximum degree of filling. The control of the travel speed occurs here through variation of the motor speed. In distinction, the hydrodynamic coupling is filled only partially in slow travel. While the efficiency of slow travel is relatively low, only a relatively short amount of time is spent in slow travel, and the advantage achieved is that the motor can continue to operate in the range of a good torque delivery. The present invention provides a boat propeller drive which with only the hydrodynamic coupling can operate the boat in its entire, relatively large forward speed range (for instance between 4 and 50 knots). Thus, a hydrodynamic torque converter for forward travel can be omitted.

Another problem is that for initiation of the crash stop maneuver the filling of the reverse converter and the simultaneous emptying of the hydrodynamic coupling must take place within an extremely short time. The hydrodynamic coupling will empty relatively slowly in response to the crash stop signal, preferably with the use of an intake valve fashioned as a quantity control valve and a permanently open discharge channel. On the other hand, the reverse converter features preferably a simple but large-volume open/closed intake valve, so as to enable a very quick filling of the reverse converter. Upon appearance of the crash stop signal, the reverse converter is already filled during a short time span while the emptying of the coupling is just beginning. The present invention deals with the crash stop maneuver by using a converter with a relatively high torque conversion as a reverse converter. Converters of this type are known from FIG. 4 of the manuscript "Hydrodynamic Multiple Circuit Drives and their Application" (presentation of Mar. 28, 1980, Technical Academy Esslingen).

Important further aspects of the present invention concern the proper balancing of torques, specifically the coupling torque at minimum slip as well as the pump and turbine torques of the reverse converter relative to the nominal torque of the motor. As known as such, the hydrodynamic coupling is arranged so that at maximum motor speed (and thus maximum propeller speed) the coupling transmits the motor nominal torque at its minimum slip (and thus maximum efficiency) to the propeller. In order to perform well for the crash stop maneuver, it is important that the necessary but brief suppression of the motor speed be limited to a tolerable value. This is accomplished by the reverse converter (when quickly filled at the beginning of the crash stop maneuver) stressing the motor with an only relatively small input torque. But simultaneously, the turbine of the reverse converter must initially generate a maximally high output torque in order to be able to slow down the propeller as quickly as possible. The turbine torque tends in the reactive braking range of the reverse converter, to be the smallest exactly at the beginning of the crash stop maneuver. Therefore, it is important to dimension the reverse converter so that the minimum of the turbine torque will be sufficiently large in the reactive braking range. This minimum value amounts preferably to 1 to 2 times the nominal torque of the motor.

The previously mentioned crash stop maneuver requires that the emptying of the coupling take place extremely quickly. In the initial phase of this maneuver, the coupling slip briefly becomes even smaller than the minimum slip. This phenomenon can be utilized to perform the emptying of the coupling at maximum swiftness. Additionally, the present invention provides for accelerating the emptying of the coupling as well.

The present invention is, in one form, a drive system for a boat propeller, for use in a hydroglider whose propeller emerges extensively above the water surface in the upper speed range. The drive system comprises a motor and a reversing gearbox. The motor delivers a predetermined torque to the boat propeller. The reversing gearbox is disposed between the motor and the boat propeller, and includes an input shaft coupled to the motor, an output shaft coupled to the boat propeller, a hydrodynamic coupling, and a hydrodynamic torque converter. The hydrodynamic coupling drives the boat propeller in a forward direction of travel, having a primary impeller wheel connected to the input shaft and a secondary impeller wheel connected to the output shaft. The primary impeller wheel and the secondary propeller wheel define a torus-shaped working space. The coupling is the only means of hydrodynamic power transfer for the entire forward upper speed range, with the amount of hydraulic fluid within the working space being variable. The hydrodynamic torque converter drives the boat propeller in a reverse direction of travel and may perform the reactive braking maneuver. The converter is structured and arranged as a reverse converter having a pump impeller wheel connected to the input shaft and a turbine wheel connected to the output shaft. Also, the ratio of negative torque of the turbine wheel to positive torque from the pump impeller wheel is in the range of 2 to 5 during the reactive braking maneuver.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
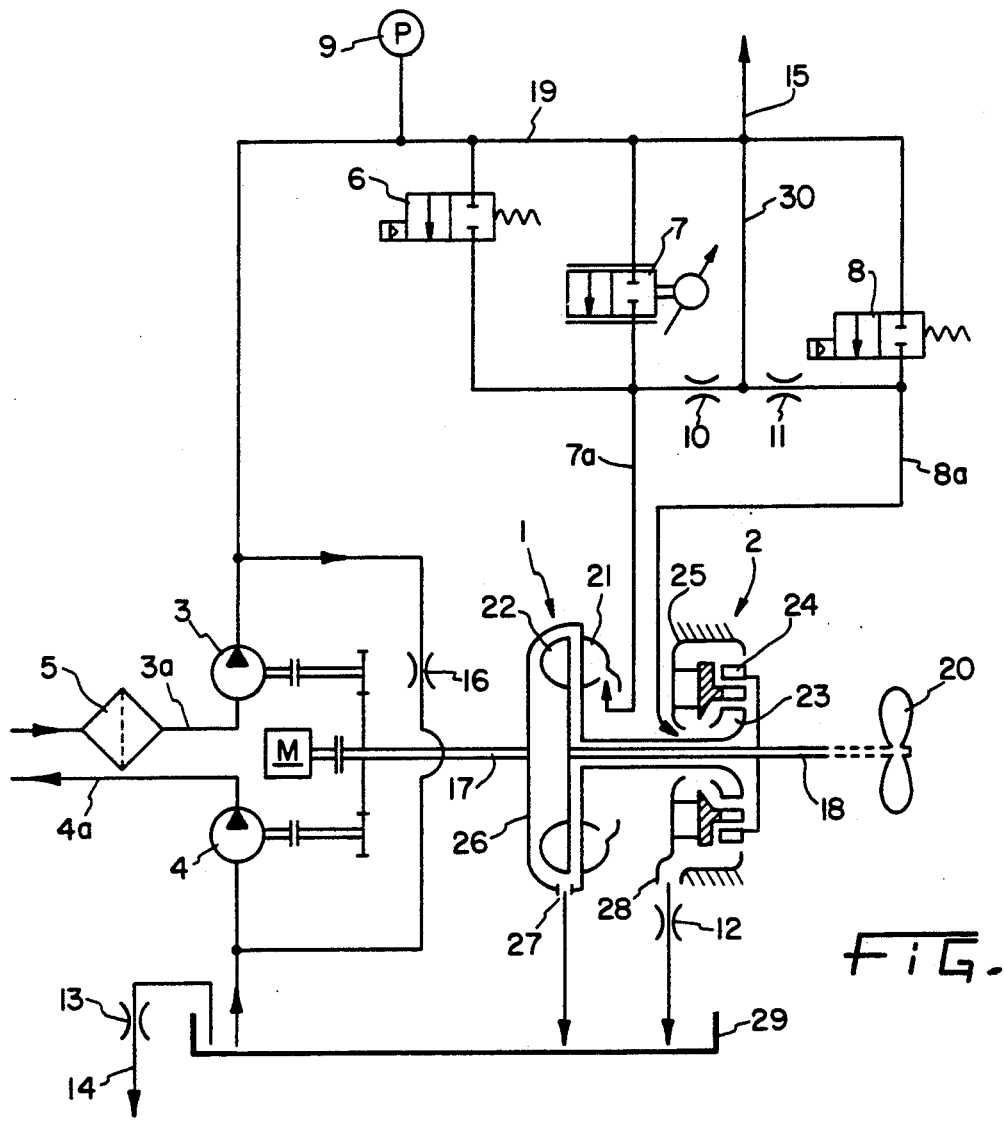
FIG. 1 is a schematic diagram of a drive system with a hydrodynamic reverse gearbox and with the pertaining line system for the working fluid.

FIG. 1 shows motor M, a reverse gearbox with a hydrodynamic coupling 1 and hydrodynamic reverse converter 2 as well as a boat propeller 20 to be driven. Input shaft 17 of the reverse gearbox is coupled to motor M, impeller wheel 21 of coupling 1, and to pump impeller wheel 23 of reverse converter 2. Output shaft 18 of the reverse gearbox is coupled to secondary impeller wheel 22 of coupling 1 and to turbine impeller wheel 24 of reverse converter 2. Further power transfer elements between output shaft 18 and boat propeller 20 are illustrated only symbolically through broken lines. Hydrodynamic reverse converter 2 comprises in known fashion stationary converter shell 25 with which the required stationary vane rings are connected. Hydrodynamic coupling 1 has coupling shell 26 which connects input shaft 17 with impeller wheel 21.

The operating fluid for the reverse gearbox may preferably be seawater which is taken in by means of fill pump 3 through suction line 3a and filter 5 from the vicinity of the watercraft. Mechanically driven by motor M via input shaft 17, fill pump 3 feeds the water into pressure line 19 (with gauge 9). Pressure line 19 connects via intake valve 7 with intake line 7a which empties into hydrodynamic coupling 1. Additionally, pressure line 19 is connected through another intake valve 8 with intake line 8a which leads to reverse converter 2. Intake valve 7, which is coordinated with the coupling 1, is fashioned as a quantity control valve. Since coupling 1 features at least one permanently open discharge channel 27, varying filling degrees and thus different slip values may be selected by variation of the amount of flow through intake valve 7 to coupling 1. This makes it possible to adjust the speed of rotation of boat propeller 20 continuously to different values, without changing the speed of motor M (this is used primarily in the lower speed range of the propeller). Additionally, open/close valve 6 may be provided for, if required.

Connected to pressure line 19, for purposes of quickly filling coupling 1, may be open/close intake valve 6 which, by means of line 7b bypasses quantity control valve 7, is connected with intake line 7a of coupling 1. Valve 6 may be omitted if quantity control valve 7 is able to open quickly.

Intake valve 8, which is coordinated with reverse converter 2, is designed as an open/close valve. Thus, for simplification of the system, converter 2 is either completely filled or completely drained. The draining may be effected, e.g., through a (not illustrated) open/close outlet valve or, preferably, (as illustrated), through permanently open outlet opening 28 which is provided with construction point 12.

The water draining from coupling 1 and/or converter 2 proceeds into collecting container 29 and from there, by means of drain water pump 4 and via line 4a back into the open. Pressure line 19 may be connected with the suction line of drain pump 4 through line 16a (with choke 16). This precludes the risk of running drain water pump 4 dry. Additionally, pressure line 19 may be connected with each of two input lines 7a and 8a, bypassing intake valves 7 and 8, by means of bypass line 30 and via choke 10 and 11 each. This is significant when a watercraft features several such drive systems whose pressure lines 19 may be connected by means of connection line 15 (additionally water containers 29 are in this case connected through connection line 14 with choke 13). Should the drive system illustrated in FIG. 1 be nonoperational while another drive system connected with it is operating, a small amount of operating fluid may, for purposes of cooling, proceed into coupling 1 and into converter 2 through lines 15, 30, 7a, and 8a.

Figure 2:
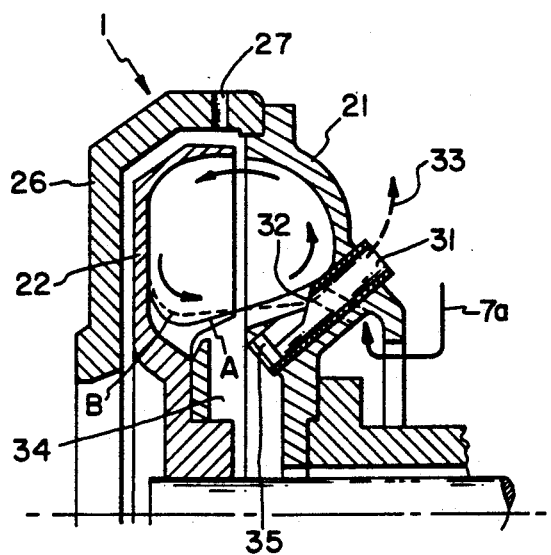
FIG. 2 is a side view, in partial cross-section, of the hydrodynamic coupling of the reverse gearbox.

FIG. 2 shows several additional details of hydrodynamic coupling 1. Provided in impeller wheel 21 (in addition to outlet channel 27 contained in shell 26) is another outlet channel 31. Its intake opening 32 is located in the radially inner area of the working space. Outlet channel 31 may be formed (as illustrated) by a tube section which sideways is cut open. Alternatively, it may also be cast into primary impeller wheel 21. In any case, this additional outlet channel 31 forms a means for limiting the filling degree of coupling 1. This arrangement allows for attainment of a minimal slip when the maximum degree of filling exists. Thus, the drive system can run for a longer period of time automatically at maximum efficiency. An over-filling of the coupling and a resulting increased minimum slip are thus avoided.

Solid line A illustrates the radially inner limitation of the fluid torus at normal power transfer and thus at the usual minimum slip of, e.g. 2%. Broken line B, conversely, shows the radially inner limitation of the fluid torus for the case that converter 2 is suddenly being filled at a crash stop maneuver. When a crash stop maneuver is initiated, coupling 1 remains filled for a short time and the speed of rotation of secondary impeller wheel 22 continues to be at its full value, whereas the speed of rotation of primary impeller wheel 21 is slightly reduced through the torque surge caused by converter 2. As a result, part of the working fluid is now captured by intake opening 32 of additional outlet channel 31 and drained outside (illustrated by dash-dot arrow 33).

In the further course of the crash stop maneuver, however, a quick reduction of the speed of rotation of output shaft 18 occurs, and the coupling slip increases as a result. Part of the working fluid proceeds thereby into back-up space 34. Depending on operating conditions, part of this working fluid may advantageously escape from back-up space 34 directly through outlet channel 31. However, for some operating conditions it may be desirable to prevent working fluid from escaping by closing the connection from back-up space 34 to outlet channel 31 with plug 35.

Figure 3:
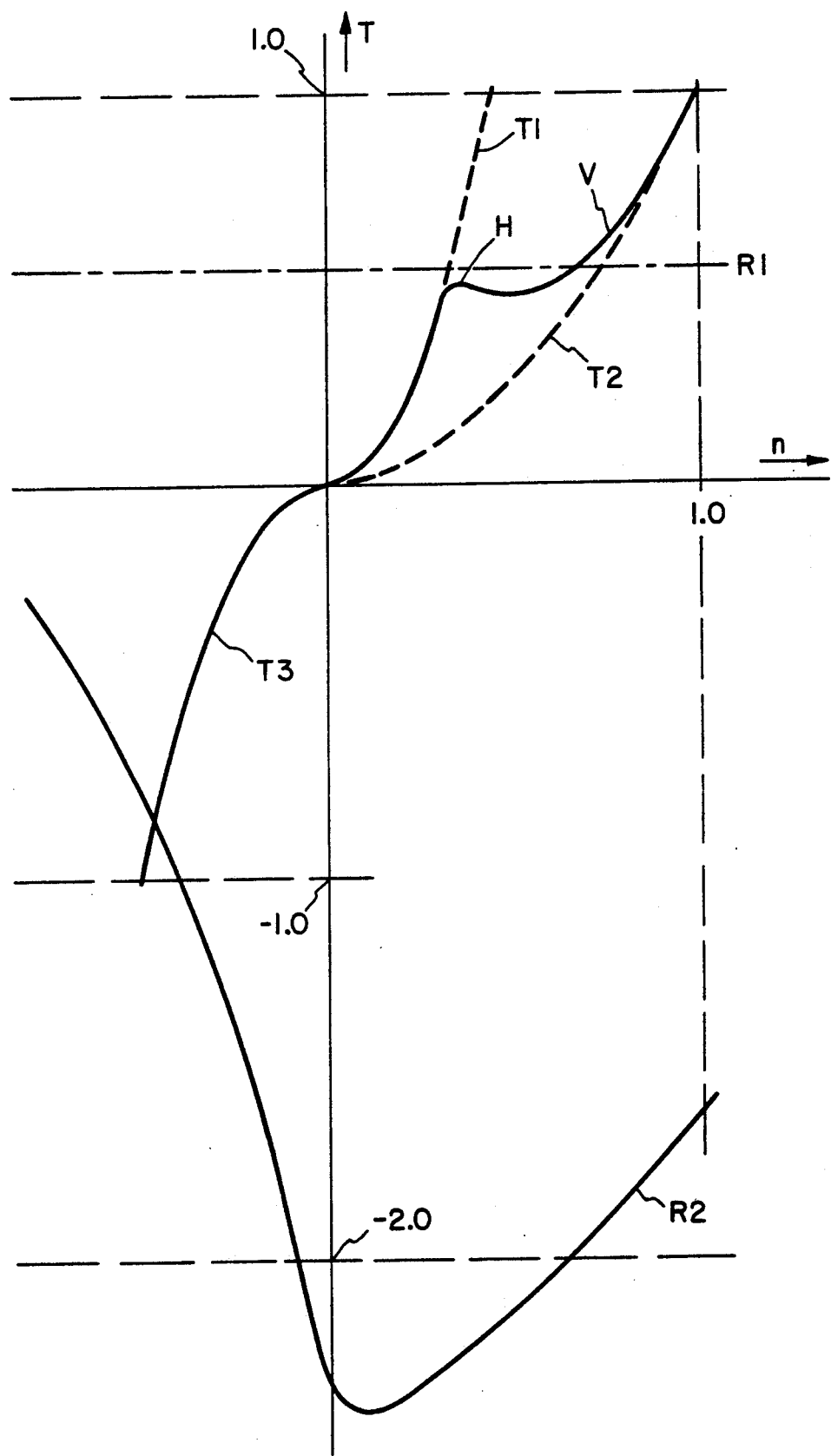
FIG. 3 is a graph showing the pattern of various torques T over the propeller speed n.

Illustrated in the right-hand upper quadrant of the graph shown in FIG. 3, solid line V represents the contingency of the propeller torque on the speed of rotation n of propeller 20 (FIG. 1). As can be seen, propeller torque V, starting from standstill (where the speed of rotation is zero) follows at first a relatively steep parabola T1. In this lower speed range, propeller 20 is still located completely below the water surface. In the range of the maximum propeller speed 1.0, propeller torque V proceeds along considerably flatter parabola T2. In this operating condition, the boat hydroplanes a certain distance above the water surface so that only the lowermost area of the surface of rotation of propeller 20 continues to be immersed in the water. Therefore, the required drive torque for the propeller is, in this operating condition, relatively low as compared to the start-up phase. In the intermediate range, in which propeller 20 emerges gradually from the water, propeller torque V changes over from steeper parabola T1 to flatter parabola T2. In this transition, V curve has near parabola T1 hump H, for instance at approximately 30% of the maximum propeller speed. The propeller torque at the maximum propeller speed $n-1.0$ is signified as $T-1.0$. This equals preferably the nominal torque of motor M. As explained above, the power transfer takes place in this range through hydrodynamic coupling 1. Thus, the torque $T-1.0$ is at the same time the nominal torque of coupling 1 at its minimum slip.

Approximately in the range between 50 and 100% of the maximum propeller speed, coupling 1 is operated at its maximum degree of filling and minimum slip. In this range, the motor torque is always greater or equal to the propeller torque. In the range of lower propeller speeds, however, the motor torque would be smaller than the propeller torque if coupling 1 would continue to be operated with its full degree of filling. Here, it is therefore necessary to operate coupling 1 with a partial filling, i.e., with greater slip values that allow motor M to deliver a higher torque at higher speeds of rotation.

In the left-hand lower quadrant of FIG. 3, parabola T3 represents the propeller torque during reverse travel, i.e., with propeller 20 driven through reverse converter 2. The boat and the propeller continue to be immersed in the water during the reverse travel.

Illustrated in the upper half of FIG. 3, additionally, is the pattern of pump torque R1 of reverse converter 2. As can be seen, pump torque R1 ranges approximately at one-half of the nominal torque of motor M. Illustrated additionally is turbine torque R2 of reverse converter 2. In the right-hand lower quadrant of FIG. 3 (the "reverse braking" range), the turbine torque ranges approximately between 1.5 and 2.5 times the nominal torque of motor M. The maximum value ranges near the propeller speed of rotation $n-0$. Occurring in the reactive braking range, the lowest turbine torque R2 of the turbine ranges at the maximum propeller speed $n-1.0$.

The following will now explain the aforementioned crash stop maneuver, wherein the propeller speed must be reduced, e.g., from its maximum value of $n-1.0$ within the shortest time to zero value or into the negative range (reverse travel). The abrupt filling of converter 2 suddenly subjects motor M to additional load from the pump torque R1 of reverse converter 2. Further, turbine 24 of converter 2 swiftly exerts a high braking torque on propeller shaft 18. While coupling 1 empties relatively slowly, it transmits braking torque to input shaft 17. While this results in the aforesaid suppression of motor speed, it also results in a distinct reduction of the propeller speed during the initial phase of the crash stop maneuver, causing the propeller to slow the boat. Thereafter, coupling 1 empties more and more causing the motor speed to quickly increase again. As a result, the rise of the converter/turbine torque accelerates along curve R2, causing the boat to quickly come to standstill or change over to reverse travel.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive system for a boat propeller, for use in a hydroglider whose propeller emerges extensively above the water surface in the upper speed range, said drive system comprising:
   a motor for delivering a predetermined torque to the boat propeller; and
   a reversing gearbox disposed between said motor and the boat propeller, said reversing gearbox including:
   an input shaft coupled to said motor;
   an output shaft coupled to the boat propeller;
   a hydrodynamic coupling provided with a quantity control valve adapted to provide at least one fluid fill level within the hydrodynamic coupling between the fluid levels of empty and full, and further adapted to drive the boat propeller in a forward direction of travel and having a primary impeller wheel connected to said input shaft and a secondary impeller wheel connected to said output shaft, said primary impeller wheel and said secondary impeller wheel defining a torus-shaped working space, said coupling being the only means of hydrodynamic power transfer for the entire forward upper speed range, and the amount of hydraulic fluid within said working space being variable; and a hydrodynamic torque converter adapted to drive the boat propeller in a reverse direction of travel and adapted to perform a reactive braking maneuver, said converter structured and arranged as a reverse converter having a pump impeller wheel connected to said input shaft and a turbine wheel connected to said output shaft, wherein the ratio of negative torque of said turbine wheel to positive torque from said pump impeller wheel is in the range of 2 to 5 during said reactive braking maneuver.

2. The drive system of claim 1, wherein torque transmitted by said coupling at its minimum slip approximately equals said predetermined torque from said motor, torque transmitted by said converter is in the range of 40-70% of said predetermined torque during said reactive braking maneuver, and the minimum value of torque transmitted by said converter is in the range of 1.0 to 2.0 times said predetermined torque during said reactive braking maneuver.

3. The drive system of claim 2 wherein torque from said converter is approximately 50% of said predetermined torque during said reactive braking maneuver.

4. The drive system of claim 1 wherein said coupling includes a permanently open outlet channel and intake valve controlling the quantity of flow of working fluid into said working space, said primary impeller wheel of said coupling having a plurality of outlet channels which extend from said working space outward and are arranged so that the filling degree of said working space at minimum slip will be limited to a predetermined value, said outlet channels having intake openings located in a radially inner area of said working space.

5. The drive system of claim 4 wherein said coupling further defines a back-up space located radially within said working space, said back-up space being in communication with said outlet channels.

6. The drive system of claim 5 further comprising a filling pump, a pressure line connected to said filling pump, a coupling intake valve connected to said pressure line, a coupling intake line connected to said coupling intake valve and said coupling, a converter intake valve connected to said pressure line, a converter intake line connected to said pressure line and said converter, a first choke connected to said pressure line and said coupling intake line, and second choke connected to said pressure line and said converter intake line, said filling pump operably connected to pump hydraulic fluid whereby a fluid coupling is formed through said first and second chokes which bypasses said coupling intake and said converter intake valves.

* * * * *